United States Patent
Lapidot et al.

(10) Patent No.: US 10,730,750 B2
(45) Date of Patent: *Aug. 4, 2020

(54) ACID RECOVERY FROM ACID-RICH SOLUTIONS

(71) Applicant: MELODEA LTD., Rehovot (IL)

(72) Inventors: Shaul Lapidot, Kibbutz Tzora (IL); Clarite Azerraf, Ashdod (IL); Inbar Kremer, Givataim (IL)

(73) Assignee: MELODEA LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,608

(22) Filed: Apr. 2, 2019

(65) Prior Publication Data

US 2019/0225492 A1 Jul. 25, 2019

Related U.S. Application Data

(63) Continuation of application No. 15/538,101, filed as application No. PCT/IL2015/051223 on Dec. 16, 2015, now Pat. No. 10,287,164.

(30) Foreign Application Priority Data

Dec. 21, 2014 (IL) .......................... 236365

(51) Int. Cl.
*C01B 15/08* (2006.01)
*C01B 17/90* (2006.01)
*D21C 11/00* (2006.01)

(52) U.S. Cl.
CPC ............ *C01B 17/905* (2013.01); *C01B 15/08* (2013.01); *D21C 11/0007* (2013.01)

(58) Field of Classification Search
CPC ....... C01B 17/90; C01B 17/905; C01B 15/08; D21C 11/007
See application file for complete search history.

(56) References Cited

U.S. PATENT DOCUMENTS

| | | | |
|---|---|---|---|
| 1,842,884 A | 1/1932 | Taylor | |
| 2,631,974 A | 3/1953 | Conwell | |
| 3,856,673 A | 12/1974 | De La Mater et al. | |
| 4,085,016 A | 4/1978 | Janjua et al. | |
| 4,157,381 A | 6/1979 | Bodenbenner et al. | |
| 5,026,535 A | 6/1991 | Jonsson et al. | |
| 8,052,953 B2 | 11/2011 | Chen | |
| 10,287,164 B2* | 5/2019 | Lapidot | C01B 17/905 |
| 2006/0280674 A1 | 12/2006 | Macias Horta et al. | |
| 2012/0282660 A1* | 11/2012 | Van Groenestijn | C12P 7/10 435/105 |
| 2014/0093920 A1* | 4/2014 | Zhang | C08H 8/00 435/105 |
| 2014/0196715 A1* | 7/2014 | Rivas Torres | C13K 13/002 127/37 |
| 2016/0355444 A1* | 12/2016 | Olkowski | C08H 6/00 |

FOREIGN PATENT DOCUMENTS

| | | |
|---|---|---|
| DE | 196 14 642 A1 | 8/1997 |
| JP | 2013-501825 A | 1/2013 |
| WO | 2011/017797 A1 | 2/2011 |

OTHER PUBLICATIONS

Huling et al., "In Situ Chemical Oxidation", Engineering Issue. Ground Water and Ecosystem Restoration Information Center, UAEPA, EPA/600/R-06/072 (2006).

* cited by examiner

*Primary Examiner* — Timothy C Vanoy
(74) *Attorney, Agent, or Firm* — Vorys, Sater, Seymour and Pease LLP

(57) ABSTRACT

Provided is an unique, efficient and cost-effective process for the recovery of acid from acid-rich solutions. The process of the subject matter utilizes a strong oxidizer, such as Caro's acid, to disintegrate or render insoluble organic or inorganic materials such as carbohydrates and complexes thereof contained in acid-rich solutions, to make efficient and simple the separation and recovery of the acid solution. The acid recovered thus obtained is free of organic matter, and containing nearly all of the acid originally contained in the acid-rich solution.

6 Claims, 6 Drawing Sheets

ACID RECOVERY FROM ACID-RICH SOLUTIONS

TECHNOLOGICAL FIELD

The invention generally provides processes for recovery of acid from acid-rich solutions and mixtures.

BACKGROUND

The regeneration of chemical-spent acid from industrial processes is highly desirable for a verity of reasons, ranging from reducing industrial waste and contamination of landfills to reduction of costs associated with the reproduction of acid.

The recovery of acid has been demonstrated in a variety of industrial set-ups.

U.S. Pat. No. 2,631,974 [1] discloses an electrolytic system for the recovery of certain ingredients from the waste liquors discharged from various chemical processes, in particular with the recovery of sulfate ions in acid aqueous solutions containing them by the conversion thereof into aqueous sulfuric acid solutions of sufficient purity to be of commercial value.

U.S. Pat. No. 8,052,953 [2] discloses a method for recovering sulfuric acid from concentrated acid hydrolysate of plant cellulose material.

One of the main barriers in utilizing acid in industrial applications is the relatively high cost which is associated mainly with a high energy requirement needed to recover it. Therefore, there is great need for reducing the production cost and energy requirements involved in such processes.

Sulfuric acid is one of the more common acids in industrial use. The addition of hydrogen peroxide to sulfuric acid results in the formation of a very strong oxidizer, known as Caro's Acid or the Piranha solution, which has the ability to oxidize or hydroxylate most metal surfaces and remove most organic matter. The common application of the Piranha solution is in the microelectronics industry to clean photoresist residues from silicon wafers. It is also used to clean glassware by hydroxylating the surface, thus increasing the number of silanol groups on the surface.

U.S. Pat. No. 3,856,673 [3] discloses a process for purifying a spent acid stream containing organic impurities and at least 60% sulfuric acid. The process disclosed utilizes a stoichiometric amount of an oxidizer such as hydrogen peroxide to achieve oxidation of organic materials such as nitrocresols and nitrophenolic compounds.

Huling et al [4] teach oxidation of organic compounds utilizing hydrogen peroxide.

REFERENCES

[1] U.S. Pat. No. 2,631,974
[2] U.S. Pat. No. 8,052,953
[3] U.S. Pat. No. 3,856,673
[4] Huling S. G. and Pivetz B. E. In Situ Chemical Oxidation. Engineering Issue. Ground Water and Ecosystem Restoration Information Center, UAEPA, EPA/600/R-06/072 (2006)

SUMMARY OF THE INVENTION

The inventors of the present invention have developed a unique, efficient and cost-effective process for the recovery of acid from acid-rich solutions. The process of the invention utilizes a strong oxidizer, such as Caro's acid, to disintegrate or render insoluble organic or inorganic materials such as carbohydrates and complexes thereof contained in acid-rich solutions, to thereby make efficient and simple the separation and recovery of the acid solution. The acid recovered is thus obtained as an aqueous acid solution, being free of organic matter, and containing nearly all of the acid originally contained in the acid-rich solution.

Thus, the invention described herein affords separating and recovering acids, such as sulfuric acid, from a variety of organic components such as hydrolysates of plant cellulose materials commonly used in the paper industry, such components may or may not be "in solution", namely some or all of the organic components may be insoluble in the original acid-rich solution to be recovered.

In one of its aspects, the present invention provides a process for acid recovery from an acid-rich aqueous solution, the solution comprising at least one acid to be recovered and at least one organic material (being different from the acid material and typically containing at least one carbohydrate material or a complex thereof), the process comprising:

treating said solution with at least one oxidizer or at least one precursor of the oxidizer, wherein the oxidizer is capable of oxidizing the organic material contained in the solution into at least one insoluble or gaseous species;

removing or allowing separation of said insoluble or gaseous species from the acid solution;

to yield a substantially enriched acid solution, substantially free of organic matter (being free of said organic impurities, as disclosed herein).

The invention further provides a process for recovery of acid, such as sulfuric acid, from an acid-rich mixture comprising at least one acid, e.g., sulfuric acid, and an amount of organic matter, the process comprising contacting the mixture with an oxidizer or a precursor thereof, thus producing an acid enriched solution, wherein the oxidized organic matter precipitates or evaporates from the acid enriched mixture.

The enriched acid solution being substantially free of organic matter may be further treated to further remove traces of unoxidized organic matter, residues of oxidized organic matter and insoluble species.

In some embodiments, the enriched acid solution being substantially free of organic matter contains up to 1,000 ppm of organic matter.

The acid solution may be any acid-containing aqueous solution which is used or generated in any one of a variety of industries or industrial processes, ranging from stainless steel production to microchip manufacturing. As the acid content may vary based on the industry or the process producing the acid waste, the process of the invention may be suitably configured and adapted to achieve full recovery of the acid.

In accordance with the invention, the oxidizer or a precursor thereof (e.g., hydrogen peroxide) is added to the acid-rich solution at room temperature. The reaction mixture comprising the acid-rich solution and the oxidizer or precursor thereof may be allowed to react over a period of between 1 hours and 7 days at room temperature (25-30° C.), at a temperature above 50° C., or at a temperature above 60° C., or at a temperature above 70° C., or at a temperature above 80° C., or at a temperature above 90° C., or at a temperature above 100° C., or at a temperature above 110° C., or at a temperature above 120° C., or at a temperature above 130° C., or at a temperature above 140° C., or at a temperature above 150° C., or at a temperature between 50°

C. and 100°, or at a temperature between 60° C. and 110°, or at a temperature between 70° C. and 120°, or at a temperature between 80° C. and 130°, or at a temperature between 90° C. and 140°, or at a temperature between 100° C. and 150°, or at a temperature between 50° C. and 150°, or at a temperature between 60° C. and 140°, or at a temperature between 70° C. and 130°, or at a temperature between 80° C. and 120°, or at a temperature between 90° C. and 100° C.

In accordance with the invention, the oxidizer or a precursor thereof (e.g., hydrogen peroxide) is added to the acid-rich solution at a temperature below room temperature (being the temperature at which the reaction mixture comprising the acid-rich solution and the oxidizer or precursor thereof may be allowed to react). In some embodiments, the temperature is between −30° C. (minus 30 degrees Centigrade) and 0° C. In some embodiments, the temperature is between −30° C. and −20° C. In some embodiments, the temperature is between −30° C. and −10° C. In some embodiments, the temperature is between −20° C. and −10° C. In some embodiments, the temperature is between −20° C. and 0° C. In some embodiments, the temperature is between −10° C. and 0° C. In some embodiments, the temperature is between −30° C. and 5° C. In some embodiments, the temperature is between −30° C. and 10° C. In some embodiments, the temperature is between −30° C. and 15° C. In some embodiments, the temperature is between −30° C. and 20° C. In some embodiments, the temperature is between −30° C. and 25° C. In some embodiments, the temperature is between −30° C. and 30° C. In some embodiments, the temperature is between 0° C. and 5° C. In some embodiments, the temperature is between 0° C. and 10° C. In some embodiments, the temperature is between 0° C. and 15° C. In some embodiments, the temperature is between 0° C. and 20° C. In some embodiments, the temperature is between 0° C. and 25° C. In some embodiments, the temperature is between 0° C. and 30° C.

In some cases, the oxidizer or a precursor thereof is added to the acid-rich solution at room temperature and the temperature of the reaction mixture is allowed to increase spontaneously (in case of an exothermic reaction). In some embodiments, the temperature increase is controlled such that the temperature does not increase above 50° C., above 60° C., above 70° C., above 80° C., above 90° C., above 100° C., above 110° C., above 120° C., above 130° C., above 140° C., or to above 150° C.

After the oxidizer completely oxidizes the organic material, traces of the organic material and the remaining oxidizing agents may be removed from the acid enriched solution using any method that is common in the field of the art. In some embodiments, the solid oxidized material and solid oxidizer may be removed by filtration. Where the oxidized material is a gaseous species, it may be removed from the acid-enriched solution by evaporation, by heating, under vacuum, by stirring, or by saturating the acid-enriched solution with an inert gas.

In some embodiments, the trace materials and the remaining oxidizing agents may be removed by mechanical or chemical adsorption or by absorption e.g., on activated carbon, by flocculation or precipitation.

The process of the invention may be repeated by employing consecutive cycles and using the herein defined substantially carbon-free acid formulation as a substrate in acid-based processes.

The oxidizer used in accordance with the invention is typically a "strong oxidizer" which is capable of converting an organic material into one or more oxide forms which are less soluble or more easily evaporable as compared to the unoxidized form. The oxidizer is said of being a strong oxidizer as it is capable of oxidizing the majority of the organic material contained in the solution, namely 100 wt % of the organic material, 99%, 98%, 97%, 96%, 95%, 94%, 93%, 92%, 91%, 90%, between 80% and 100%, between 90% and 100%, between 80% and 95%, or between 80% and 90% of the organic material. Typically, the oxidized form of the organic material is insoluble in the acid solution or is easily removable from the acid solution, e.g., by evaporation, by filtration, by heating, under vacuum, by activated carbon, etc.

In some embodiments, the oxidizer has a Standard Electrode Potentials ($E^0$) greater than +1 Volts.

In some embodiments, the oxidizer is selected to have $E^0$ between +1 and +2.

The oxidizer is selected to effectively oxidize the organic material without substantially chemically affecting the acid component. Some non-limiting examples of oxidizers include ammonium perchlorate, ammonium permanganate, barium peroxide, bromine, calcium chlorate, calcium hypochlorite, chlorine trifluoride, chromium anhydride, chromic acid, dibenzoyl peroxide, fluorine, hydrogen peroxide, mangesium peroxide, nitrogen trioxide, perchloric acid, potassium bromated, potassium chlorate, potassium peroxide, propyl nitrate, sodium chlorate, sodium chlorite, sodium perchlorate, sulphuric acid and sodium peroxide.

In some embodiments, the oxidizer is hydrogen peroxide ($H_2O_2$).

In other embodiments, the oxidizer is $H_2SO_5$ (Caro's acid). In some embodiments, $H_2SO_5$ (Caro's acid) is formed in situ.

In some embodiments, the oxidizer is utilized for forming in situ a stronger oxidizer.

According to embodiments where the oxidizer is formed in situ, an oxidizer (e.g., hydrogen peroxide) or a precursor of the oxidizer which is convertible into the oxidizer in the presence of the acid in the acid-rich solution, is added to the acid-rich solution and transforms an amount of the acid in the solution into the oxidizer. In embodiments where a precursor of the strong oxidizer is hydrogen peroxide and the acid is sulfuric acid, a small amount of "Caro's acid" forms in situ and oxidizes the carbon-based or carbon-containing material, e.g., carbohydrates, to at least one insoluble or gaseous species (e.g., $CO_2$ and $SO_2$) and water; thus, yielding a substantially carbon-free acid enriched solution (e.g., sulfuric acid).

Thus, the invention also contemplates a process for acid recovery from an acid-rich aqueous solution, the solution comprising at least one organic material (being different from the acid material and selected, e.g., from carbohydrates and complexes thereof), the process comprising:

treating said solution with Caro's acid or with at least one precursor thereof for enabling in situ formation of Caro's acid in the solution, wherein the organic material contained in the solution is transformed into at least one insoluble or gaseous species;

removing or allowing separation of said insoluble or gaseous species from the acid solution;

to yield a substantially enriched acid solution, substantially free of organic matter.

As noted above, where Caro's acid is used in the process of the invention, the acid-rich solution may be treated with an amount of a pre-prepared Caro's acid or may be treated with an amount of sulfuric acid and hydrogen peroxide, step wise, to form in situ the Caro's acid and permit transformation of the organic material, as detailed herein.

The invention further provides a process for recovery of sulfuric acid from an aqueous solution rich in sulfuric acid, the solution further comprising at least one soluble organic material, as defined herein, the process comprising:

treating said solution with Caro's acid or with hydrogen peroxide, to transform the organic material contained in the solution into at least one insoluble or gaseous species;

removing or allowing separation of said insoluble or gaseous species from the acid solution;

to yield a substantially enriched acid solution, substantially free of organic matter.

The "acid-rich solution" is generally a formulation or a combination of materials or a mixture or a medium comprising between about 5% and between about 98% acid by weight, water and at least one carbon material. The acid in the acid-rich solution may be an organic or mineral acid. In some embodiments, the solution comprises between about 5% and about 90% acid by weight, or between about 30% and about 85% acid by weight, or between about 30% and about 80% acid by weight, or between about 30% and about 75% acid by weight, or between about 30% and about 60% acid by weight.

In some embodiments, the solution comprises between about 35% and about 95% acid by weight, or between about 40% and about 95% acid by weight, or between about 45% and about 95% acid by weight, or between about 50% and about 95% acid by weight, or between about 55% and about 95% acid by weight.

In some embodiments, the solution comprises between about 40% and about 90% acid by weight, or between about 50% and about 85% acid by weight, or between about 60% and about 80% acid by weight, or between about 60% and about 75% acid by weight, or between about 60% and about 65% acid by weight.

In some embodiments, the solution comprises between about 60% and about 90% acid by weight, or between about 60% and about 85% acid by weight, or between about 60% and about 80% acid by weight, or between about 60% and about 75% acid by weight, or between about 60% and about 65% acid by weight, or between about 70% and about 90% acid by weight, or between about 70% and about 85% acid by weight, or between about 70% and about 80% acid by weight, or between about 70% and about 75% acid by weight, or between about 80% and about 95% acid by weight, or between about 80% and about 90% acid by weight, or between about 80% and about 85% acid by weight, or between about 90% and about 95% acid by weight.

In some embodiments, the concentration of the acid in the acid-rich solution is between 1 and 98%, or between 30% and 63%. In other embodiments, the concentration of the acid is between 40% and 63%, between 59% and 63% or is between 60 and 64%.

The acid to be recovered from the acid-rich solution may be a single type of acid or a combination of acids. The acid is usually recovered as an aqueous solution.

As the process of the invention permits conversion of the organic soluble and insoluble materials contained in the acid-rich solution into insoluble organic materials or gaseous species, and permitting their removal, without substantially affecting the acid content, the process of the invention is suited for recovering a plurality of acids and acid combinations. In some embodiments, the acid to be recovered is a mineral acid. Some non-limiting examples of mineral acids include hydrochloric acid (HCl), nitric acid (HNO$_3$), phosphoric acid (H$_3$PO$_4$), sulfuric acid (H$_2$SO$_4$), boric acid (H$_3$BO$_3$), hydrofluoric acid (HF), hydrobromic acid (HBr) and perchloric acid (HClO$_4$).

In some embodiments, the acid is sulfuric acid (H$_2$SO$_4$). In some embodiments, the acid-rich solution containing sulfuric acid is treated with a precursor of a strong oxidizer capable of reacting with an amount of the sulfuric acid in the solution to form a strong oxidizer. In some embodiments, the precursor is hydrogen peroxide.

As stated above, the majority of the organic material contained in the acid-rich solution is removed. Thus, the resulting substantially carbon-free acid solution contains an aqueous acid (e.g. sulfuric acid) solution that contains less than 10%, 9%, 8%, 7%, 6%, 5%, 4%, 3%, 2%, 1%, 0.5%, 0.3%, 0.1% by weight of a carbon material.

The amount of the organic material remaining after acid recovery, namely the Total Organic Carbon (TOC) may be determined by a variety of methods, for example: (1) TOC Analyzer, and (2) titration with analytical KMnO$_4$.

In some embodiments, the TOC may be measured in parts per million (ppm). In such embodiments, the resulting substantially carbon-free acid solution contains between 0.05 and 900 ppm TOC. In some embodiments, the amount of TOC is between 5 and 900 ppm, between 5 and 500 ppm, between 5 and 300 ppm, between 10 and 900 ppm, between 10 and 500 ppm, between 10 and 300 ppm, between 50 and 900 ppm, between 50 and 500 ppm, between 50 and 300 ppm, between 100 and 900 ppm, between 100 and 500 ppm, between 100 and 300 ppm, between 500 and 1,000 ppm, between 600 and 1,000 ppm, between 700 and 1,000 ppm, between 800 and 1,000 ppm or between 900 and 1,000 ppm.

The carbon material may be any carbonaceous material, i.e., any material containing or composing carbon. The carbonaceous material may be of high molecular weight.

The "organic material", or "organic matter", or "carbon materials", all being used herein interchangeably, is "carbonaceous material", based on carbon and may or may not be soluble in the acid solution. In some embodiments, the organic matter is insoluble in the acid solution. In some embodiments, the organic matter is fully soluble in the acid solution. In some embodiments, the organic matter is a mixture of such materials, some are soluble and the remaining insoluble in the acid solution. In some embodiments, the organic matter comprises at least 50% insoluble material (in the acid solution). In some embodiments, the organic matter comprises a mixture of soluble and insoluble materials, present in a ratio of 0.001:99.999, respectively (out of the total amount, weight, of the organic matter to be oxidized and removed). In some embodiments, the w/w ratio is 1:1, 1:2, 1:3, 1:4, 1:5, 1:6, 1:7, 1:8, 1:9, 1:10, 10:1, 9:1, 8:1, 7:1, 6:1, 5:1, 4:1, 3:1, 2:1, 2:3, 2:5, 2:7, 2:9, 2:11, 11:2, 9:2, 7:2, 5:2, 3:2, respectively.

The organic material may be selected from biological materials, organic materials derived from nature, solvents, and/or organic chemicals used in various industries. In some embodiments, the organic material is selected from natural materials such as hydrocarbons, carbohydrates, proteins, amino acids, lignin, lipid and natural resins. In some embodiments, the carbonaceous material is at least one carbohydrate material.

In some embodiments, the organic material to be oxidized and thereby removed is at least one hydrolysate of plant cellulose material, e.g., as commonly used in the paper industry. In some embodiments, the organic material to be oxidized and thereby removed is at least one carbohydrate or a complex thereof. In some embodiments, the organic material to be oxidized and thereby removed is at least one carbohydrate decomposition product, such as furfural, levulinic acid, hydroxymethylfurfural (HMF), acetic acid, formic acid, monosaccharides such as glucose and xylose and others.

For example, sulfuric acid-containing waste solutions are products of a great variety of processes used in the biomass industry where biomass, such as wood or wood products, is treated with acid to separate out various hydrocarbons, particularly carbohydrates. Cellulose which makes up the major part of plant biomass is greatly used in a variety of industries, particularly in the paper industry, e.g., acid-rich solutions of hydrolyzed cellulose products.

Nano Crystalline Cellulose (NCC) also known as Cellulose Whiskers (CW) and crystalline nanocellulose (CNC), are fibers produced from acid hydrolysis of cellulose, typically being high-purity single crystals of cellulose. Thus, in such processes for the production of NCC large amounts of acid, e.g., sulfuric acid, are used, which may be regenerated as disclosed herein.

Thus, the herein defined acid-rich solution may be a byproduct of a process of NCC production or a byproduct of any chemical process which yields the herein defined acid-rich solution. Thus, in some embodiments, the carbon material is a hemicellulose derivative. In some embodiments, the carbon material is selected from galactose, rhamnose, arabinose, xylose, mannose, cellulose, glucose, hydroxymethylfurfural (HMF), galacturonic acid, lignin derivatives, levulinic acid, cellulose ethers and cellulose esters.

In some embodiments, the carbon material is a carbohydrate, a disaccharide, a monosaccharide, an oligosaccharide or a polysaccharide.

In some embodiments, the concentration of the acid (e.g., sulfuric acid) in the NCC acid-rich solution comprising acid and a carbohydrate is between 1 and 98%, or between 30% and 63%. In other embodiments, the concentration of the acid is between 40% and 63%, between 59% and 63% or is between 60 and 64%.

Thus, the process of the invention may be utilized to purify and collect acid-rich solutions used in the paper industries and may comprise at least one carbohydrate as defined herein, or at least one hemicellulose or derivative thereof, or any of the carbonaceous materials disclosed.

The amount of oxidizer precursor (e.g., hydrogen peroxide) to be added, according to some embodiments, to the acid-rich formulation for enabling in situ synthesis of the strong oxidizer (e.g., Caro's acid) depends of various parameters inter alia reaction time, temperature, carbohydrate concentration, acid:solid ratio, as recognized by the person of skill in the art. In some embodiments, the precursor, e.g., hydrogen peroxide, is added to the acid-rich formulation at a concentration of between about 2 and about 10%. In other embodiments, the amount of the precursor material, e.g., hydrogen peroxide is between 2 and 9%, between 2 and 8%, between 2 and 7%, between 2 and 6%, between 2 and 5%, between 2 and 4%, between 2 and 3%, between 3 and 10%, between 3 and 9%, between 3 and 8%, between 3 and 7%, between 3 and 6%, between 3 and 5%, between 3 and 4%, between 4 and 10%, between 4 and 9%, between 4 and 8%, between 4 and 7%, between 4 and 6%, between 4 and 5%, between 5 and 10%, between 5 and 9%, between 5 and 8%, between 5 and 7%, between 5 and 6%, between 6 and 10%, between 6 and 9%, between 6 and 8%, between 6 and 7%, between 7 and 10%, between 8 and 10%, or between 9 and 10%.

In other embodiments, the amount of precursor material, e.g., hydrogen peroxide, is between 10 and 30%, between 12 and 30%, between 14 and 30%, between 16 and 30%, between 18 and 30%, between 20 and 30%, between 22 and 30%, between 24 and 30%, between 26 and 30%, between 28 and 30%, between 10 and 25%, between 12 and 25%, between 14 and 25%, between 16 and 25%, between 18 and 25%, between 20 and 25%, between 10 and 20%, between 12 and 20%, between 14 and 20%, between 16 and 20%, between 18 and 20%, between 25 and 30%, between 3 and 30%, between 5 and 30%, between 7 and 30% or between 9 and 30%.

In some embodiments, the amount of the precursor material e.g., hydrogen peroxide, or the amount of the oxidizer is not stoichiometric.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A depicts the carbohydrates produced following hydrolysis of cellulose.

FIG. 1B shows the general decomposition process of carbohydrates.

FIG. 1C shows a suggested mechanism for the oxidation of carbohydrates by $H_2SO_5$ (Caro's acid).

DETAILED DESCRIPTION OF EMBODIMENTS

Figure 1A:
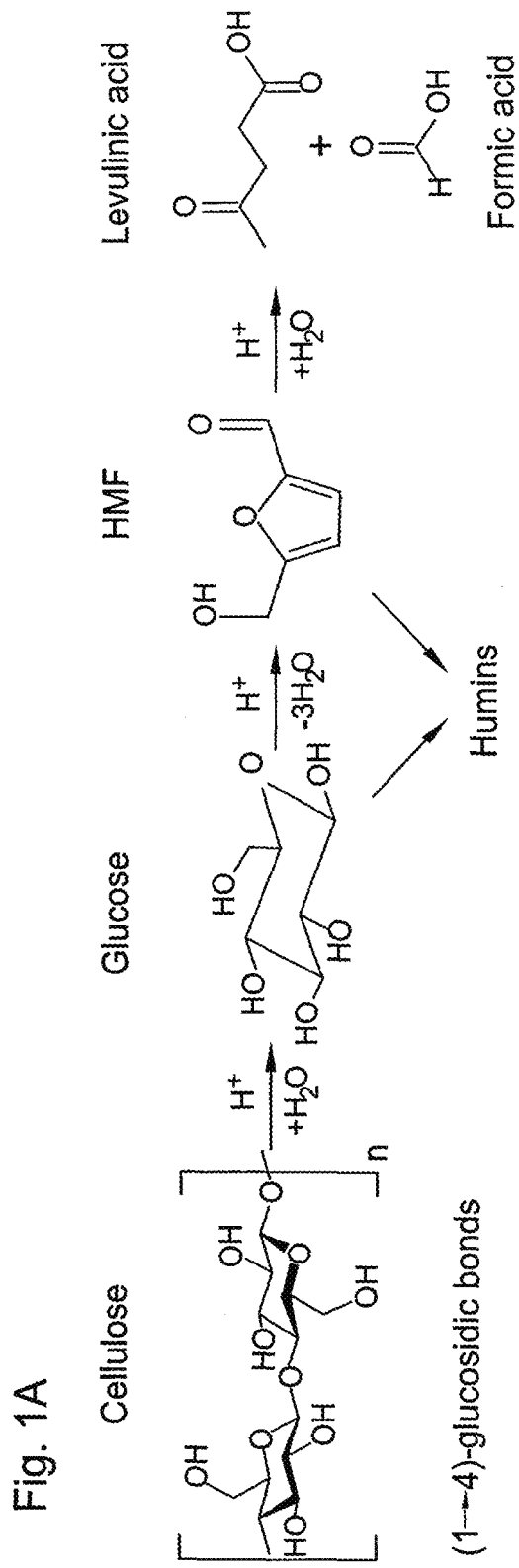
FIGS. 1A-C provide a general depiction of carbohydrate decomposition in the presence of a strong oxidizer.

The invention provides a process for separating or recovering acid from acid-rich solutions comprising soluble and/or insoluble organic matter. The cost-effectiveness of the process of the present invention is improved considerably compared to prior art processes as a result of using an oxidizer which is capable of substantially completely oxidizing the organic material while leaving unaffected the acid material, thus not affecting acid losses. Under such a set up, it is possible to carry out the acid recovery at a relatively low temperature, e.g., below 100° C., and from acid solutions containing no less than between 100 and 400 times as much organic contaminants.

An additional advantage of the invention resides in the fact that no, or only little, undesired by-products, such as soluble oxidized organic materials are formed. These too may be removed by further processing of the acid solution.

Example 1: Process of Recovering Acid from Acid-Rich Formulations 7.54 kg of 30% $H_2O_2$ (5% of $H_2O_2$ weight per weight final solution) were loaded at R.T to 38 kg ~60% sulfuric acid suspension containing 2.2% carbohydrates (weight per solution weight). The composition of the suspension was around ⅔ of insoluble complex carbohydrates (e.g. cellulose, hemicellulose) and ⅓ soluble carbohydrates (monomeric+polymeric) and their derivatives. Such an acid formulation contained glucose (9.8 g/L-30 g/L), galactose (<0.2 g/L), arabinose (<0.2 g/L), mannose (<0.2 g/L), xylose (0.6 g/L-1.8 g/L), formic acid (<1 g/L), acetic acid (<1 g/L), levulinic acid (<1 g/L), hydroxymethylfurfural (HMF) (<0.2 g/L) and furfural (<0.2 g/L).

The reaction mixture was stirred at R.T until it exothermed or was refluxed)(110°-130° and monitored by spectrophotometer. After 90 minutes the absorption in the region 400 nm-1100 nm reached a minimum, indicating that the majority of the organic material was oxidized. Thereafter, the reaction was cooled down. After 90 minutes, the solution was completely clear.

The thus-obtained cleared acid formulation was basically free of organic matter, or contained very minute amounts of organic matter. To further purify the acid formulation, the following steps were optionally carried out.

0.76 kg of activated carbon (2% of Activated carbon weight per weight of initial 60% acid) were loaded at R.T to a "cleared solution" of 44 kg ~50% sulfuric acid solution containing traces of carbohydrates and ~5% $H_2O_2$. The solution was mixed and monitored by spectrophotometer and TOC levels measured by titration with $KMnO_4$. After 8 h the absorption in the region 400 nm-1100 nm and the titer amount reached minimum and the reaction was cooled down and filtered. The "cleaned solution" was thereafter used in further acid-based reactions.

Example 2: General Process of Recovering Acid from Acid-Rich Formulations from NCC Production Processes The above process was also used for acid recovery of acid formulations used in industrial process for utilizing paper products, paper pulp or generally cellulose materials.

The general sequence of process steps is exemplifies herein by acid recovery from an acid-rich solution which is an end-solution in the production of NCC. The process of the invention may comprise:
  Step 1. Separation of concentrated sulfuric acid from the hydrolyzed NCC suspension; and
  Step 2. Decomposition of carbohydrates contained in the sulfuric acid solution by the addition of hydrogen peroxide.
The oxidized products may thereafter be removed by a multitude of additional steps or ways.

The process of the present invention may further comprise additional steps as follows:
  Step 1. Separation of concentrated sulfuric acid from the hydrolyzed NCC suspension;
  Step 2. Decomposition of carbohydrates contained in the sulfuric acid solution by the addition of hydrogen peroxide;
  Step 3. Decomposition of the remaining oxidizing agents by different methods such as UV, activated carbon etc.; and
  Step 4. Optionally, adsorption of the remaining organic traces in the solution using an adsorbent such as activated carbon.
In a process conducted according to the invention, implementing steps 1, 2 and optionally steps 3 and 4, and in order to maximize recovery of the sulfuric acid, a controlled hydrolysis of cellulose fibers was further carried out.

The conditions for the acid hydrolysis used to extract the crystalline particles from a variety of cellulose sources was very narrow (e.g., acid concentration, reaction time, temperature, acid:solid ratio). It is commonly known that during at the end of the hydrolysis, during NCC production, the mixture is typically diluted with water to quench the reaction, and only then the mixture undergoes a series of separation and washing (centrifugation or filtration). The more the acid is diluted, the less cost effective its recovery. Thus, the present invention renders such dilution steps unnecessary, and thus cost-effective.

Example 3: Process of Recovering Acid from Acid-Rich Formulations from NCC Production Processes Step 1: Separation of Concentrated Acid Following separation of concentrated sulfuric acid from the hydrolyzed NCC suspension, the high majority of the reaction mixture weight was obtained in the supernatant in the first separation. This "used solution" contained nearly all of the acid originally used in the reaction for making the NCC, along with soluble carbohydrates.

The NCC was precipitated with some of the acid originally put in.

Figure 1B:
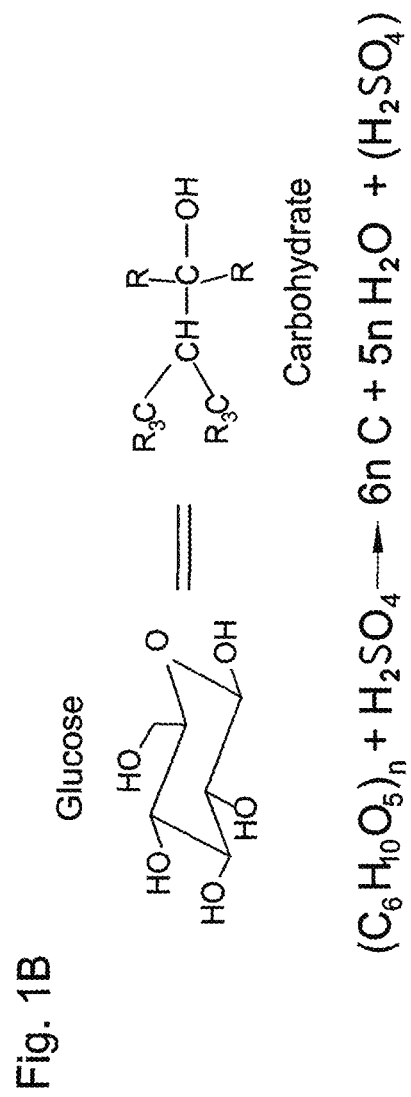

Step 2: Decomposition of Carbohydrates in Sulfuric Acid Solution by Hydrogen Peroxide The "used solution" contained a variety of carbohydrates. The composition of the "used solution" depended on the cellulosic raw material and on the hydrolysis conditions. FIG. 1A shows the carbohydrates produced from the hydrolysis of cellulose. For a solution that also contained other saccharides such as xylose, mannose and other hemicellulose derivatives, similar products were depicted. FIG. 1B shows the general decomposition process of the carbohydrates.

Figure 1C:
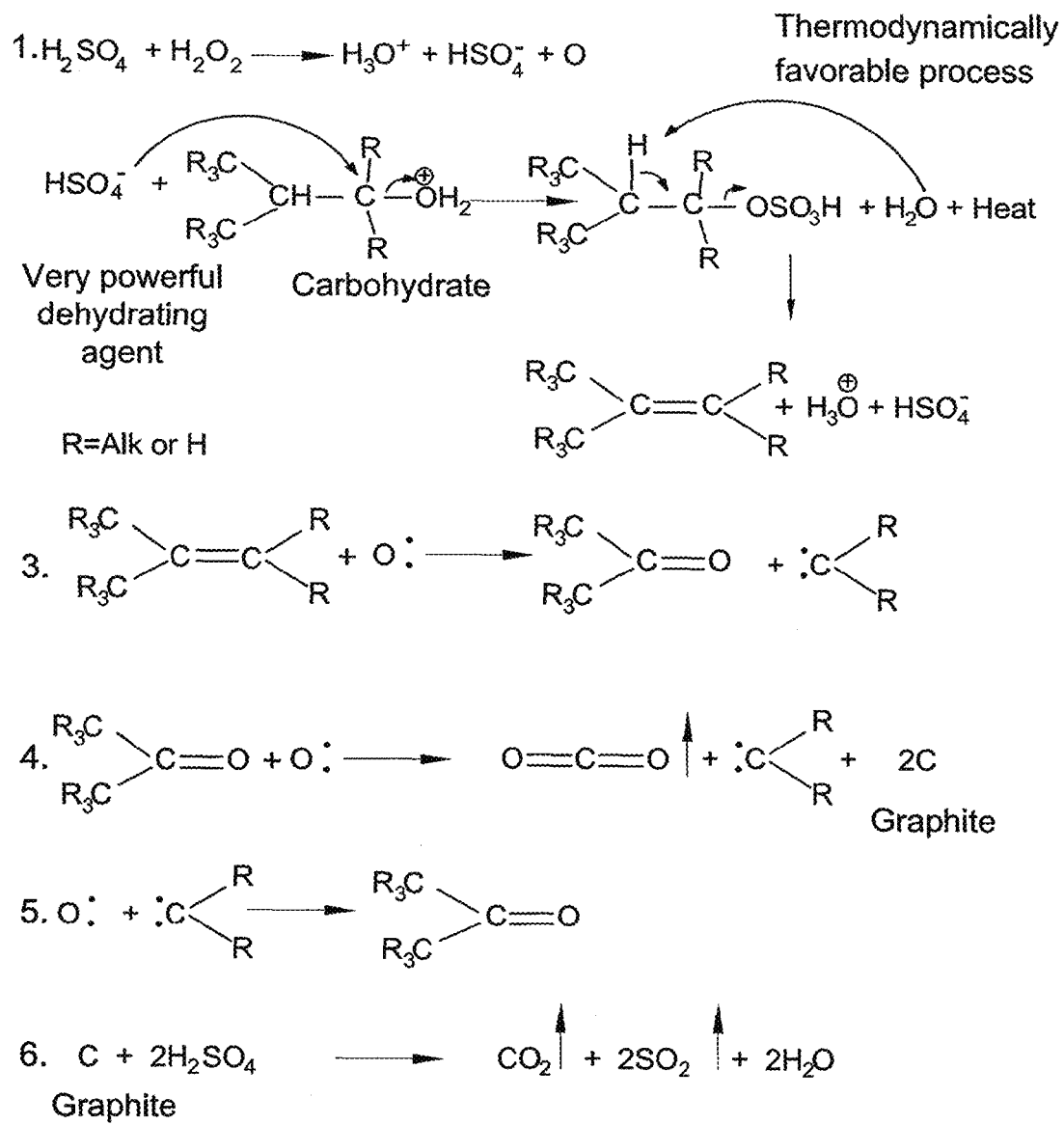

The addition of hydrogen peroxide to sulfuric acid results in the formation of Caro's Acid or Piranha solution. A suggested mechanism for the oxidation of the carbohydrates by Caro's acid is provided in FIG. 1C which demonstrates how the organic matter is converted to carbon dioxide.

Figure 2:
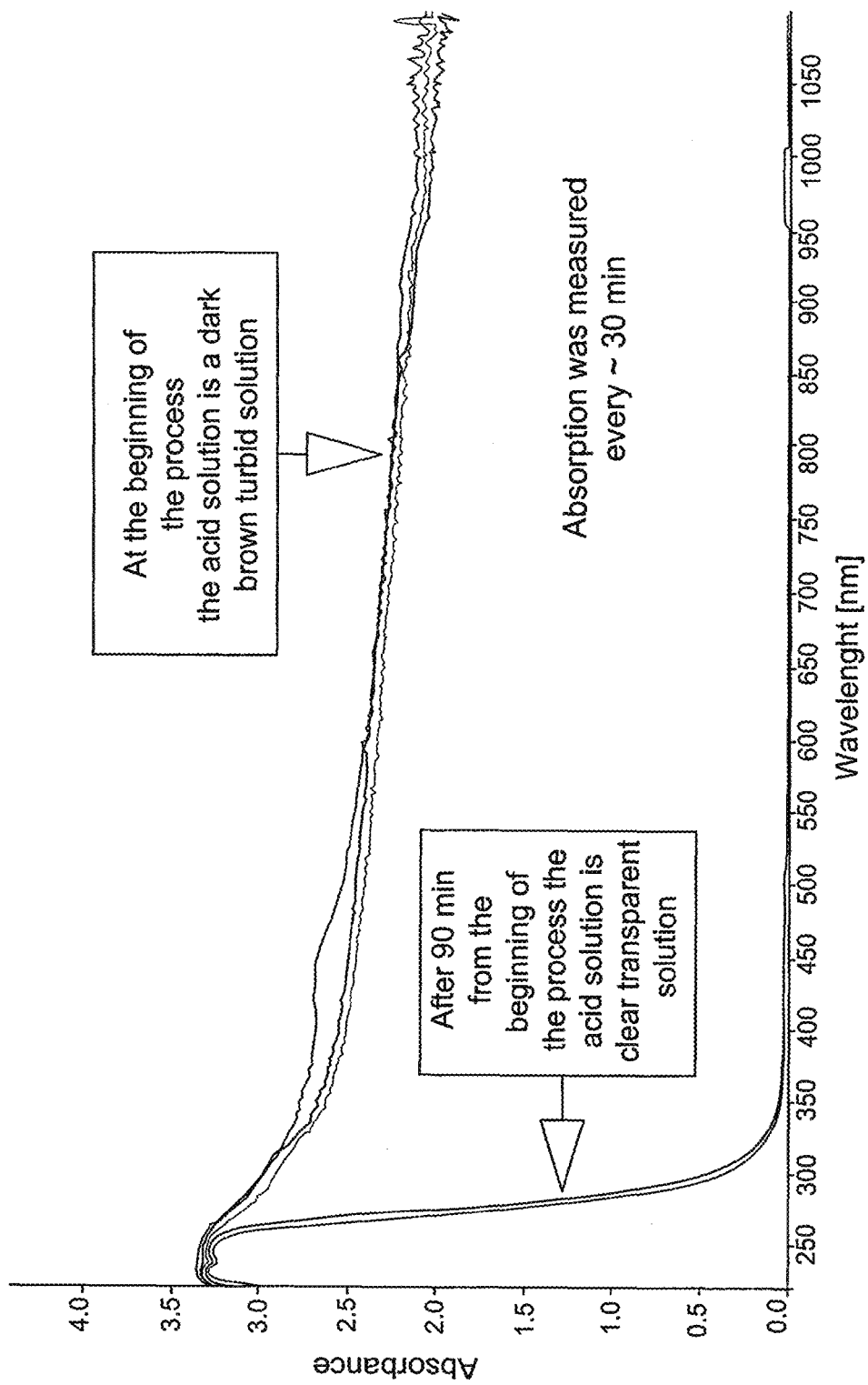
FIG. 2 shows the oxidation reaction progress monitored by colorimetric analysis using 5% $H_2O_2$.

7.54 kg of 30% $H_2O_2$ (5% of $H_2O_2$ weight per weight final solution) were loaded at R.T to a "used solution" of 38 kg ~60% sulfuric acid solution containing 2.6% carbohydrates (weight per solution weight). The oxidation reaction of the sulfuric acid solution was carried out five days after separation of the hydrolysis mixture (step 1). The reaction mixture was then refluxed)(110°-130° and monitored by spectrophotometer. After 90 minutes the absorption in the region 400 nm-1100 nm reached a minimum (FIG. 2), indicating that the majority of the organic material was oxidized. Thereafter, the reaction was cooled down. The color reduction could be seen with time. After 90 minutes, the solution was completely clear.

Figure 3A:
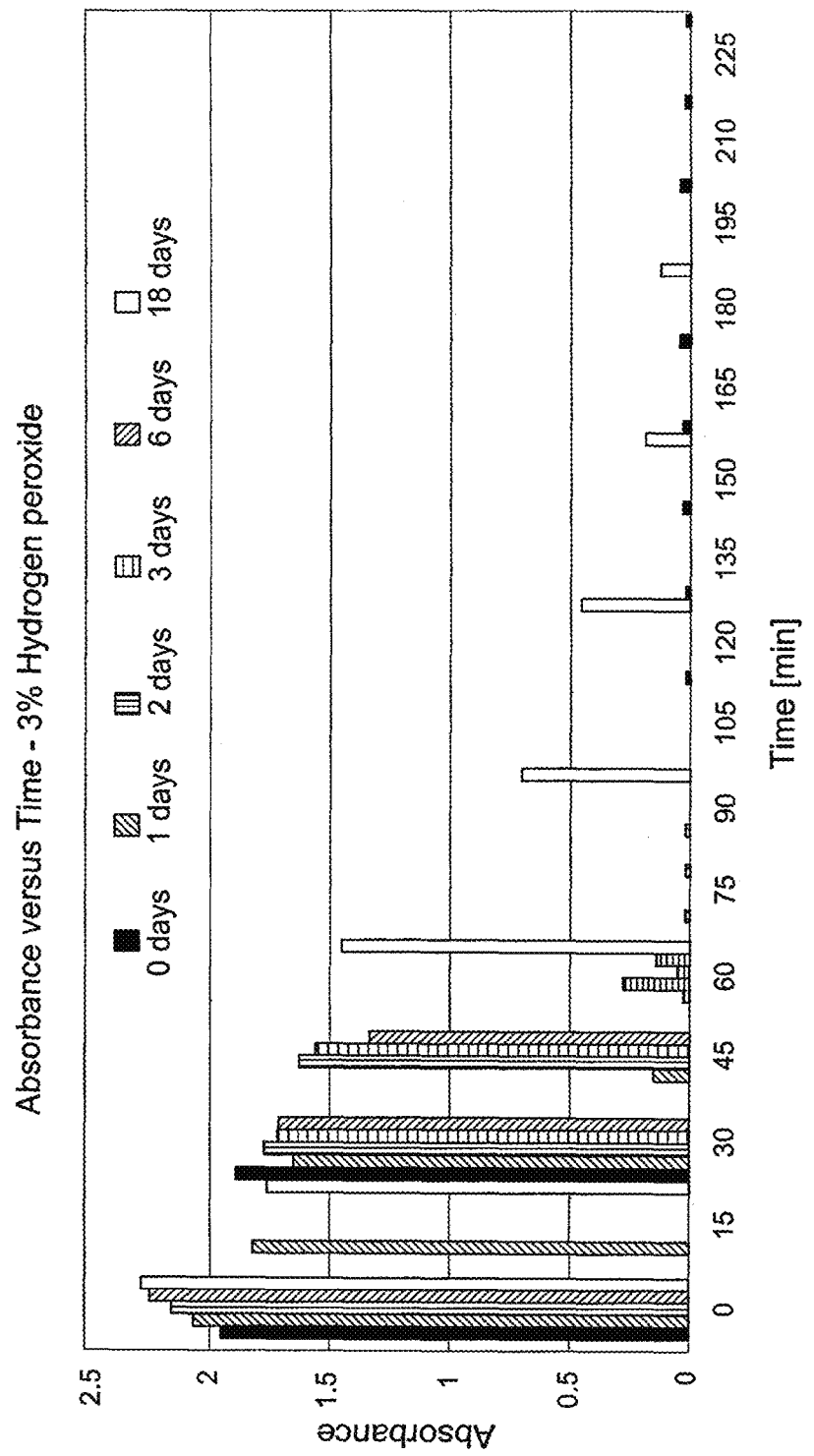
FIGS. 3A-B shows the absorbance vs. oxidation time using 3% $H_2O_2$ (FIG. 3A) and 7.5% $H_2O_2$ (FIG. 3B) for 0-19 days.
Figure 3B:
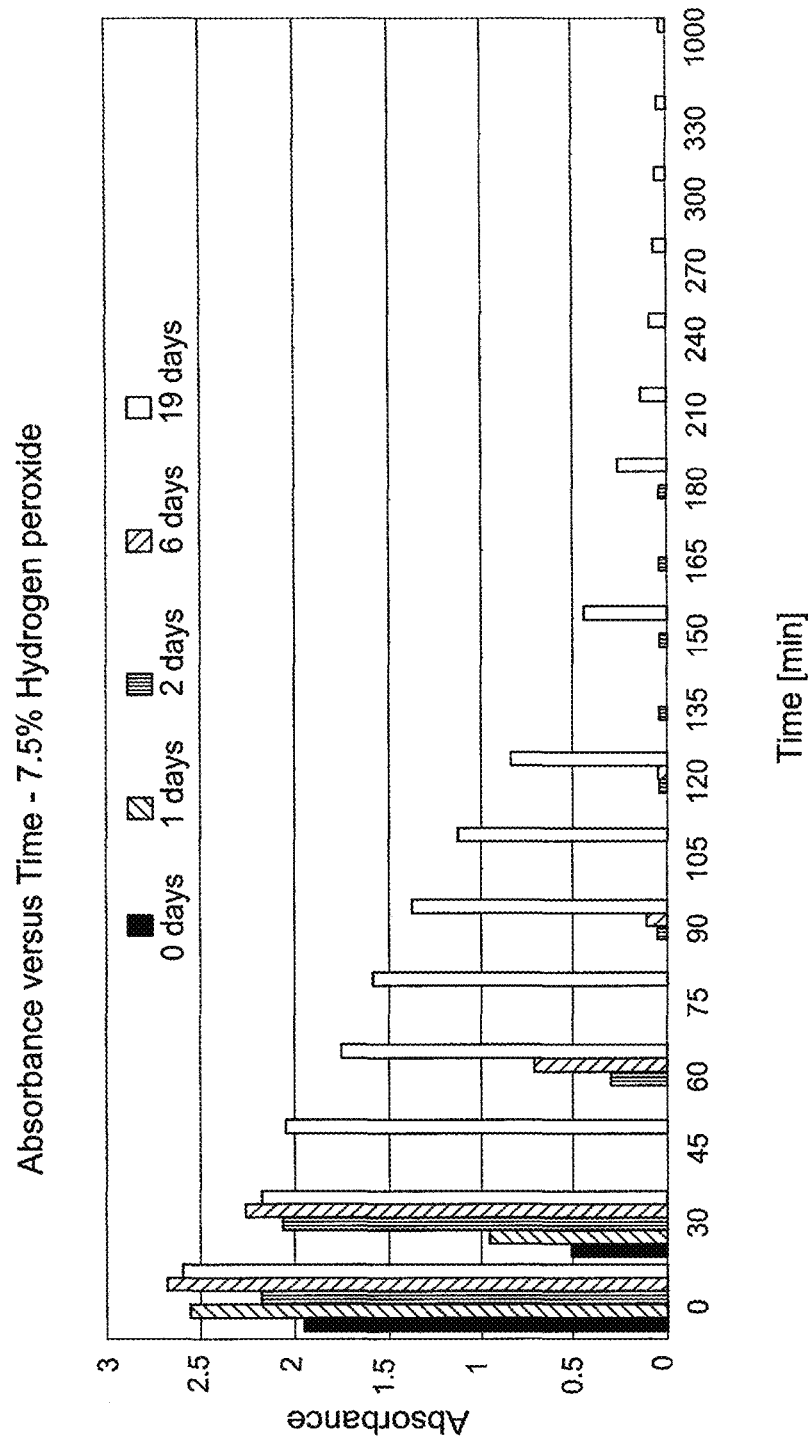
Figure 4:
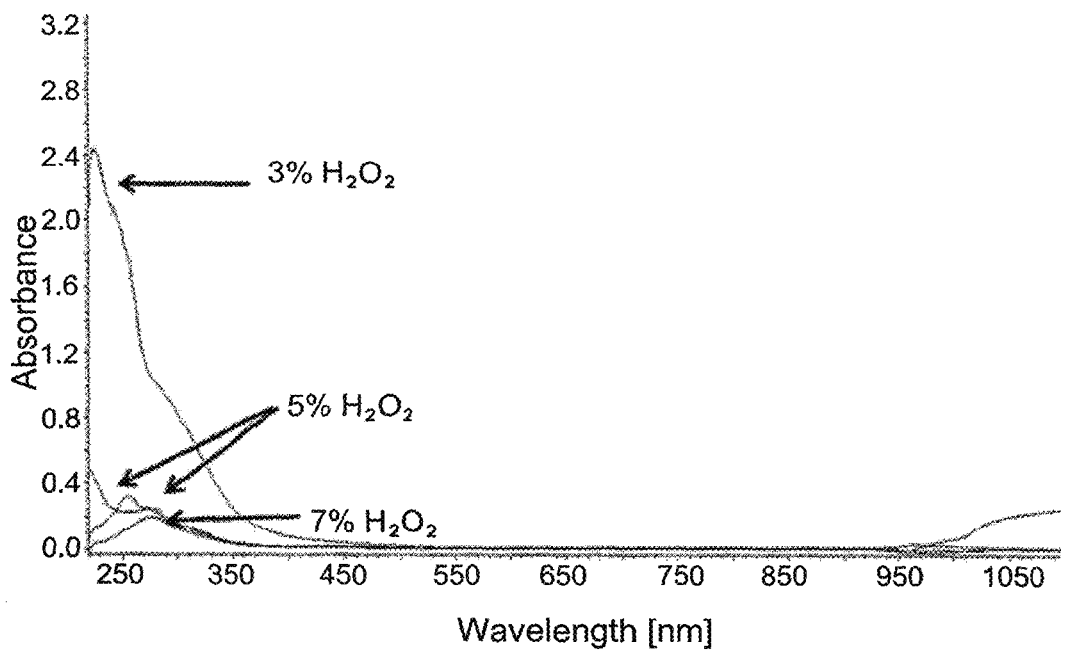
FIG. 4 depicts an example for adsorption of the remaining organic traces and oxidizing agents in the solution using activated carbon.

As FIGS. 3A-B show, for a given carbohydrate concentration, the optimal oxidation time was 90 minutes up to 6 days from the day of hydrolysis and first separation (i.e., step 1). Prolonged periods required longer oxidation times. However, complete oxidation and full recovery of acid was always possible. The optimal minimum percentage of hydrogen peroxide required for oxidizing the organic matter, depended on the carbohydrate concentration in the sulfuric acid solution. FIG. 4 shows that for a 2.6% concentration, 5% $H_2O_2$ was optimal for some solutions since it enabled the same performance of 7.5% with less dilution of the acid.

Step 3 (and Step 4): Adsorption of the Remaining Organic Traces and Oxidizing Agents in the Solution Using Activated Carbon.

This optional step(s) in the recovery process has two objectives:
A. Removal of organic traces that remained after step 2;
B. Removal of oxidizer.

Figure 5:
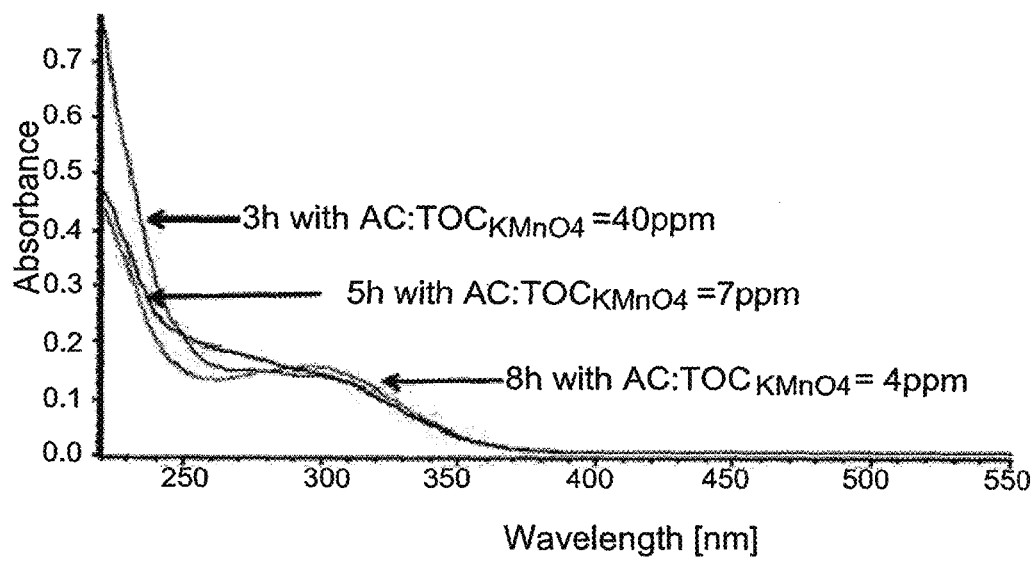
FIG. 5 describes adsorption of the remaining organic traces and oxidizing agents in the solution using activated carbon over time.

0.76 kg of activated carbon (2% of Activated carbon weight per weight of initial 60% acid) were loaded at R.T to a "cleared solution" of 44 kg ~50% sulfuric acid solution containing traces of carbohydrates and ~5% $H_2O_2$. The solution was mixed and monitored by spectrophotometer and TOC levels measured by titration with $KMnO_4$. After 8 h the absorption in the region 400 nm-1100 nm and the titer amount reached minimum (FIG. 5) and the reaction was cooled down and filtered. The "cleaned solution" was thereafter used in further acid-based reactions.

The invention claimed is:

1. A process for recovery of sulfuric acid from sulfuric acid-rich aqueous solution comprising at least 40% sulfuric acid (by weight), the solution comprising at least one organic soluble or insoluble material selected from the group consisting of galactose, rhamnose, xylose, mannose, cellulose, glucose, hydroxymethylfurfural, galacturinic acid, lignin, levulinic acid, cellulose ethers and cellulose esters, the process comprising:

treating said sulfuric acid solution with up to 10 wt % $H_2O_2$, at a temperature up to 130° C.;

to yield a sulfuric acid solution comprising separable insoluble or gaseous species derived from decomposition of said at least one organic soluble or insoluble material.

2. The process according to claim 1, wherein the sulfuric acid-rich aqueous solution comprises between 40% and 63% or 59% and 63% sulfuric acid (by weight).

3. The process according to claim 1, wherein recovery of sulfuric acid is from a process of producing nanocrystalline cellulose.

4. The process according to claim 1, wherein treating of the sulfuric acid with up to 10 wt % $H_2O_2$ forms Caro's acid in the solution and decomposes the at least one organic soluble or insoluble material.

5. The process according to claim 1, wherein the solution is treated with 5 wt % $H_2O_2$.

6. The process according to claim 1, wherein the $H_2O_2$ is added in the form of a Caro's acid solution.

* * * * *